United States Patent [19]

Pontiff et al.

[11] Patent Number: 5,059,376
[45] Date of Patent: Oct. 22, 1991

[54] METHODS FOR RAPID PURGING OF BLOWING AGENTS FROM FOAMED POLYMER PRODUCTS

[75] Inventors: Thomas M. Pontiff, Gansevoort, N.Y.; Joseph P. Rapp, Franklin Lakes, N.J.

[73] Assignee: Astro-Valcour, Incorporated, Glens Falls, N.Y.

[21] Appl. No.: 340,709

[22] Filed: Apr. 20, 1989

[51] Int. Cl.$^5$ .............................................. B29C 71/02
[52] U.S. Cl. ........................................ 264/234; 55/23; 264/37; 264/321; 264/344; 264/DIG. 15; 425/817 C
[58] Field of Search ................... 264/344, 45.9, 46.1, 264/48, 50, DIG. 14, DIG. 15, 321, 340, 234, 37; 425/4 C, 817 C; 55/23

[56] References Cited

U.S. PATENT DOCUMENTS

| | | |
|---|---|---|
| 2,774,991 | 12/1956 | McCurdy et al. ............ 264/DIG. 15 |
| 3,067,147 | 12/1962 | Rubens et al. . |
| 3,194,854 | 7/1965 | Smith .................... 425/817 C |
| 3,558,753 | 1/1971 | Edlin ..................... 425/4 C |
| 3,584,090 | 6/1971 | Parrish .................... 264/45.9 |
| 3,616,162 | 10/1971 | Noziere .................. 425/4 C |
| 3,637,458 | 1/1972 | Parrish . |
| 3,640,913 | 2/1972 | Cerra . |
| 3,644,230 | 2/1972 | Cronin . |
| 3,647,329 | 3/1972 | Reifenhauser et al. ......... 425/817 C |
| 3,657,165 | 4/1972 | Kawai et al. . |
| 3,725,320 | 4/1973 | Wang . |
| 3,808,300 | 4/1974 | Miyamoto et al. . |
| 3,810,964 | 5/1974 | Ehrenfreund . |
| 3,822,331 | 7/1974 | Cogliano .................. 425/4 C |
| 3,843,757 | 10/1974 | Ehrenfreund et al. . |
| 3,888,608 | 6/1975 | Holl ..................... 425/4 C |
| 3,960,792 | 6/1976 | Nakamura . |
| 4,110,269 | 8/1978 | Ehrenfruend . |
| 4,214,054 | 7/1980 | Watanabe et al. . |
| 4,217,319 | 8/1980 | Komori . |
| 4,337,321 | 6/1982 | Allada . |
| 4,347,329 | 8/1982 | Park . |
| 4,368,276 | 1/1983 | Park . |
| 4,387,169 | 6/1983 | Zabrocki et al. . |
| 4,399,086 | 8/1983 | Walter .................. 264/46.1 |
| 4,419,309 | 12/1983 | Krutchen ................ 264/53 |
| 4,420,448 | 12/1983 | Krutchen ................ 264/53 |
| 4,426,065 | 1/1984 | Komatsuzaki et al. .......... 264/45.9 |
| 4,528,300 | 7/1985 | Park . |
| 4,531,951 | 7/1985 | Burt et al. ................ 55/23 |
| 4,640,933 | 2/1987 | Park . |
| 4,649,001 | 3/1987 | Nakamura et al. . |
| 4,657,938 | 4/1987 | Fithian et al. . |
| 4,663,361 | 5/1987 | Park . |
| 4,681,715 | 7/1987 | Park et al. . |
| 4,694,027 | 9/1987 | Park . |
| 4,721,588 | 1/1988 | Burchard et al. .......... 264/53 |
| 4,721,591 | 1/1988 | Cheng-Shiang . |

FOREIGN PATENT DOCUMENTS

| | | |
|---|---|---|
| 135587 | 11/1946 | Australia . |
| 222674 | 1/1958 | Australia . |
| 235933 | 5/1960 | Australia . |
| 60-122131 | 6/1985 | Japan ................... 264/45.9 |
| 844801 | 8/1960 | United Kingdom ........... 264/46.1 |

OTHER PUBLICATIONS

Kirk-Othmer, *Encyclopedia of Chemical Technology*, vol. 16, pp. 385–433.
*Modern Plastics Encyclopedia*, 1986–1987, pp. 52–63.
*Encyclopedia of Polymer Science and Tehnology*, vol. 7, p. 610.

*Primary Examiner*—Jeffery Thurlow
*Attorney, Agent, or Firm*—Fisher, Christen & Sabol

[57] ABSTRACT

Objects of thermoplastic polymer foam such as, e.g., sheeting of polyolefins such as polyethylene, are treated at elevated temperatures effective to rapidly purge the foam of a substantial portion of the residual blowing agent. Significant economies are achieved by reducing the amounts of residual blowing agents (such as flammable, toxic or environmentally hazardous gases) to levels presenting no fire hazard or other safety hazards in times substantially less than required in conventional aging under ambient conditions. The processes can be carried out in ovens or other heating zones which form continuations of the basic production line, with the extracted blowing agents recycled or disposed of by combustion.

33 Claims, 2 Drawing Sheets

METHODS FOR RAPID PURGING OF BLOWING AGENTS FROM FOAMED POLYMER PRODUCTS

BACKGROUND OF THE INVENTION

1. Field of the Invention

The present invention concerns bodies of foamed thermoplastic polymers, e.g., polyolefins such as polyethylene, in forms such as sheets or planks, containing residual blowing agents which require removal for safe shipment or storage.

2. Description of the Prior Art

Thin sheets of polyolefin foams ($\frac{1}{4}$" thick and less) are useful for protective wrapping and cushioning. Such foams are disclosed in U.S. Pat. Nos. 4,694,001, 3,808,300, 3,384,090 and 3,637,458. The blowing agents used for the production of these foams include halogenated hydrocarbons, generally chlorofluorocarbons such as trichlorofluoromethane, dichlorodifluoromethane and dichlorotetrafluoroethane, and hydrocarbons, such as n-pentane, isopentane, n-butane, isobutane and propane. Chlorofluorocarbon (or CFC) blowing agents have the problems of being relatively expensive and it is believed that their release into the atmosphere is causing a decrease in the Earth's protective ozone layer. The hydrocarbon blowing agents have the disadvantage of being very flammable. It is therefore intended to devise a method of purging or removing the hydrocarbon and/or halogenated hydrocarbon blowing agent from the foam product rapidly before shipment so the customer receives a completely safe material and environmental hazards are reduced.

The foam products discussed are produced by extrusion foaming in which a thermoplastic polymer such as a polyolefin is melted and mixed, with any additives desired, in an extruder. After the components are sufficiently melted and mixed, the blowing agent(s) is injected into the extruder and mixed with the melt to form a homogenous mixture. This mixture is then cooled to the proper temperature for foaming. The foamable melt is then usually extruded under pressure through a die. Upon the release of pressure, the blowing agent volatizes to expand the polymer, forming a foamed product. In the case of sheet foam, an annular die is used and the extrudate is pulled from the die over a sizing apparatus such as a solid cylinder and then slit into one or two webs which are then wound into rolls. From the die, until the sheet is wound onto a roll, the foam usually loses about 40 to 70 percent of the blowing agent injected into the extruder. The amount dissipated during this time is dependent upon the polymer, blowing agent and foam thickness. The foam sheet, containing the remainder of the blowing agent, is wound into a roll. The problem is then to purge the foam sheet roll of the remaining blowing agent to make it safe for shipment and use, particularly if the blowing agent is a flammable material such as a hydrocarbon.

The foamable compositions of the prior art may contain permeability adjustment additives which decrease the permeability of the polyolefin to the blowing agent. The use of such additives minimizes post-extrusion collapse by making the rate at which the blowing agent leaves the cells nearly equal to the rate at which air enters the cells at or near room temperature. The use of blowing agents with relatively slow diffusion rates through polymer cell walls also helps to limit this collapse. It has been found through applicant's experimentation with prior art processes for the production of foam sheeting that if the foam is allowed to collapse too much and too fast, the foam will not fully recover to its original quality and, in fact, may be destroyed.

After a hydrocarbon-blown foam sheet is extruded and rolled up, it normally requires several weeks or even months to reduce the hydrocarbon content of the foam to a safe level if stored at or near the usual ambient temperatures (about 40° F. to 120° F.). This is also true of foam sheet which is at least partially unwound or stacked in sheets. It has been observed that rolled foam sheeting blown with halogenated hydrocarbon blowing agents loses the blowing agent from the outer layers of foam faster than from the inner layers. Obviously, the higher the temperature, the sooner this gas exchange (aging) will occur. However, this method of letting the blowing agent gradually diffuse from the foam requires warehousing facilities capable of storing a large volume of foam during its curing. Because the hydrocarbon diffuses so slowly from the foam, it would be relatively uneconomical to collect and combust the flammable residue. Therefore, the fumes would be released into the atmosphere, contributing to pollution such as low level smog and ozone.

U.S. Pat. No. 4,337,321 discloses methods for foaming heat foamable thermoplastic resin preforms in a series of foaming stages, each series comprising at least one stress-relieving foaming stage and at least one additional foaming stage subsequent thereto and at a higher temperature. The method is said to facilitate the production of foam sheets, slabs or planks of better quality than previously available from known single-stage foaming methods. An example of two-stage foaming of crosslinked polyethylene preforms is included. This patent deals exclusively with the problems of foaming thermoplastic resins, primarily with chemical blowing agent which decompose to release normally gaseous decomposition products, and does not discuss the problem of purging flammable blowing agents from completely foamed products, let alone the concept of rapid purging thereof.

U.S. Pat. No. 4,657,938 discloses sprayable and foamable insulating compositions comprising low molecular weight polymers including polyolefins, polyacrylates, polymethacrylates, polyisoprenes, polyacrylonitrile, polybutadiene and the like; a curative, and a blowing agent. The blowing agents can include hydrocarbons, optionally halogenated hydrocarbons. The purging of such blowing agents from the foamed compositions is not discussed.

U.S. Pat. No. 4,681,715 discloses steam-expandable alkenyl aromatic polymer compositions which are mixed with combination blowing agents which can include dichlorodifluoromethane in combination with a halogenated hydrocarbon, a hydrocarbon or an aliphatic alcohol. The compositions can be expanded by steam immediately after extrusion foaming or expanded after aging of the composition which has been impregnated with a volatile blowing agent. The object is to provide rapid expansion of the composition in steam to very low densities without adversely affecting the final properties or structure of the foams. The primary blowing agent is selected to have adequate stability to plasticize the polymer, which helps to lower the glass transition temperature of the polymer and thereby facilitate steam expansion according to the patent. The secondary blowing agent then diffuses out of the composition without adverse effects on the final foam properties.

This is said to be advantageous, since other plasticizing agents such as solid or liquid compounds mixed into the polymer will permanently remain in the final cell structure. Although the patent refers in col. 4 to the aging of foam beads before exposing them to the steam, there is no discussion of the problem of complete purging of flammable blowing agents from finished foam products.

Park's U.S. Pat. Nos. 4,640,933, 4,663,361 and 4,694,027 disclose expandable polyolefin compositions and methods of preparation thereof, in which isobutane or mixtures of isobutane with other physical blowing agents are employed to expand the compositions which have been modified by the addition of a stability control agent. The compositions are said to have a high degree of dimensional stability and exhibit minimal shrinkage during curing and/or aging. The '361 patent claims expandable polymeric compositions, the '933 patent claims expanded polyolefin foams and the '027 patent claims processes for preparing polyolefin foams. The process claim recites a permeation rate through an olefin polymer resin modified with the stability control agent of greater than about 1.2 times the permeation rate of air. Since these three patents issued from related applications, their disclosures are quite similar. Col. 1 describes the process of aging or curing in which the blowing agent gradually diffuses from the closed foam cells and air gradually diffuses into the cells to replace the blowing agent. Permeability modifiers and stability control agents are discussed which are designed to slow the diffusion of volatile hydrocarbon blowing agents out of polyolefin foam cells. Col. 2 describes a problem of excessive shrinkage of foam products where butane alone is used as the blowing agent, and notes that this blowing agent can normally be utilized only in small amounts in conjunction with the more expensive halogenated hydrocarbons. Col. 2 also notes a "dramatic difference" in the permeation rates between n-butane and isobutanes from polyolefin films modified with stability control agents. This disclosure provides information regarding permeation or stability control agents and the measurement of permeability, but does not discuss the problem of the lengthy times required for complete diffusion of flammable blowing agents from foam products, let alone suggesting techniques for speeding up the process. In fact, the invention disclosed appears to be directed to decreasing the rate of diffusion of the blowing agent from the foam product so that atmospheric air will permeate the cells at least as rapidly as the blowing agent diffuses, thus minimizing shrinkage or deformation in the curing process.

U.S. Pat. No. 4,721,591 discloses crosslinked polyethylene foams prepared with specialized chemical crosslinking agents or initiators. A sheet material is heated in two stages to produce a crosslinked foam material of a microcell structure. Chemical blowing agents are used rather than hydrocarbons or the like.

Clearly improved techniques are needed for removing sufficient residual blowing agent from objects produced from foamed thermoplastic polymers that the objects produced can be stored or shipped directly without constituting fire safety hazards or other safety or environmental hazards due to the slow diffusion of such blowing agents from the foam. Preferably, the improved methods should provide for rapid purging of gaseous blowing agents from foam objects to minimize processing and storage time, and most preferably be rapid enough to permit the removal of the blowing agent to take place as part of the production line process.

SUMMARY OF THE INVENTION

Accordingly, it is an object of this invention to provide methods for accelerated removal of residual blowing agents from objects produced from foamed thermoplastic polymers in sufficient amounts to substantially reduce or eliminate hazards due to the effects of flammable, toxic or environmentally damaging gases which escape to the atmosphere. It is a further object to provide such methods which are effective in purging blowing agents from such foamed objects in any suitable configuration, ranging from foam sheeting fresh from the production line to objects which are transferred from a production line to a facility employing the methods of the invention. Still another object of the invention is to provide for disposal or recycling of the residual blowing agents removed from the objects treated.

Surprisingly, it has been discovered that in accordance with the present invention, residual blowing agents can be rapidly purged from objects produced from thermoplastic polymer foams, e.g., of polyolefins such as polyethlenes, by simple processes comprising a step of treating the foam objects or structures at an elevated temperature for a relatively brief time effective to remove a substantial portion of the residual blowing agent without causing a substantial collapse of the foam forming structure.

The polyolefins can be selected from the group consisting of homopolymers and copolymers comprising olefin monomers having from 2 to about 8 carbon atoms, particularly polypropylene and the various polyethylene polymers. The effective temperature, which appears to be narrowly defined, will be well below the melting point of the polymer, and should be high enough to be effective in removing a substantial portion of the residual blowing agent in a substantially shorter time than by aging the foam objects under the normal ambient conditions. Foam objects such as sheets, planks and films can be processed, with the thinnest objects (i.e., those having the least depth of foam as measured from the surface) responding most effectively. Process sections which can be interspersed between a production line and a storage or shipping facility can include ovens or other heating means and means for transporting the foam objects through the heating zone at a rate effective to purge the desired proportion of residual blowing agent during transit, simultaneously arranging the objects to maximize the exposed surface area to facilitate diffusion of the blowing agents. In an embodiment, for example, a continuous roll of foam sheeting can be run over a series of driven rollers or plaited or piled in rumpled fashion upon a conveyor belt running through the heating zone so that the exposed surface area is maximized and residual blowing agent is purged to the desired degree during the transit of the material through the zone. The methods of the invention can be applied to foams containing any residual blowing agent which needs to be substantially eliminated before storage or shipment, but are presently most useful with foams containing flammable, toxic or environmentally hazardous blowing agents. In addition to adjusting the temperature, the configuration of the foam objects and the time they are exposed to the elevated temperature, permeability adjustment additives can be added to the polymer to adjust the relative rates of the blowing agent and air to minimize the time required for purging the blowing agent from the foam.

BRIEF DESCRIPTION OF THE FIGURES

Certain aspects of the present invention are illustrated by the figures, in which.

Further aspects and advantages of the present invention will be apparent from perusal of the following detailed description and the appended claims, which alone limit the scope of the invention.

DETAILED DESCRIPTION OF THE INVENTION

It is the object of the improved method of the present invention to use elevated temperatures to rapidly purge the flammable and/or toxic blowing agents from extruded foam products without significantly affecting their quality. The blowing agent levels contained in the foam should be reduced to a safe level within 24 hours, preferably within 12 hours or less. This method has several advantages. There is a marked reduction in the warehouse space required. After the rapid-purge treatment, the foam can be rolled or sheeted and shipped and/or used safely. It will be much easier to collect and combust or dispose of the blowing agent as its removal from the foam will be confined to the relatively small volume of the treatment chamber. Additionally, the treatment temperature can be adjusted so as to increase the thickness of the foam by up to about 15 percent, thereby decreasing density and improving the economics of the system.

There are two basic schemes in which the method can be employed. In the continuous scheme, the foam is pulled directly from the sizing apparatus and opened into a flat web. This web is then pulled through an oven containing many rollers, similar to a web accumulator. This oven surrounds the rollers and the number of rollers is determined by the vertical and horizontal spacing of the rollers, the lineal web speed and the time required in the treatment oven. The temperature of this oven is closely controlled and air is circulated and exchanged with outside (fresh) air. Optionally, the air exhausted, which would have a relatively high concentration of blowing agent, can be passed through a collection or combustion apparatus so that relatively clean air is exhausted into the atmosphere. The blowing agent can then be reused or combusted and the heat derived from its combustion could optionally be used to heat the oven or other portions of the facility. Systems for recovering halogenated hydrocarbons are commercially available from companies such as the Chemrox division of Hunter Environmental Services, Inc. of Southport, Conn. After the foam sheet web exits the oven, it preferably contains a safe level (below the lower explosive limit) of blowing agent. The foam can then be wound onto a roll, sheeted or otherwise converted and immediately shipped or used safely. Any suitable transport means can be used to pass the foam through a heat treatment zone in accordance with this continuous method.

Figure 1:
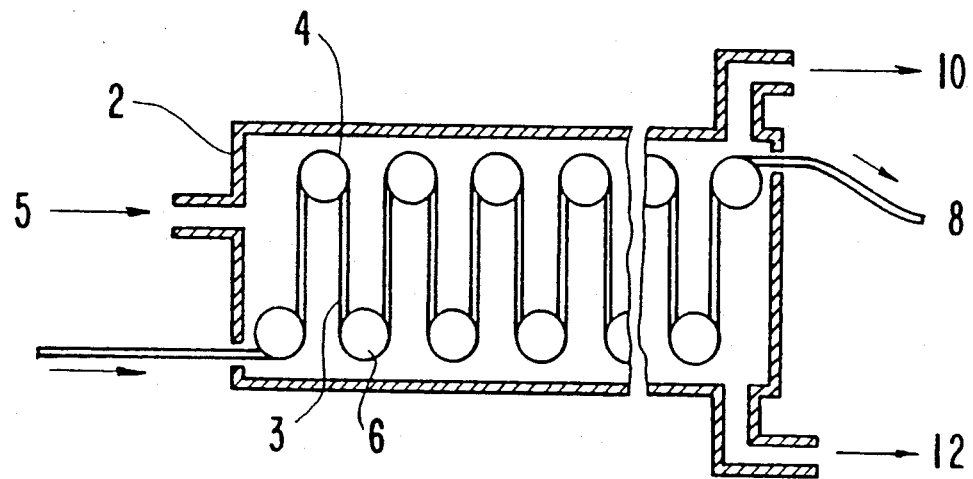
FIG. 1 is a schematic diagram of foam sheeting being transported through an oven while festooned over a series of rotating rollers.

Referring now to FIG. 1, foam sheeting can be heat-treated in accordance with the present invention by being transported from a roll or extruder (not shown) into an oven (2) fitted with a series of upper and lower transport rollers (4) and (6). The foam sheeting (3) is festooned or interlaced over these rollers so as to maximize the surface area exposed as each portion of the sheeting passes through the oven. The top rollers (4) are positively driven to advance the sheeting, driving the lower or driven rollers (6) in the process and transporting the sheet through the oven to a rewind section (8). The rollers are driven at a rate effective to advance the sheeting through the oven in a time which is effective to achieve the desired substantial reduction in residual blowing agent, given the operating temperature selected. Heated air is introduced through a plurality of suitably located ports (5) to maintain a uniform temperature within the necessary tolerance. The spent hot air is removed by port(s) (12) for disposal or recycling. Preferably, means for recovery (10) of the extracted blowing agent are provided so that the agents can be recycled or disposed of, e.g., by combustion. The means for removal of hot air and recovery or disposal of blowing agent can be combined. Such disposal means can be located at the top or bottom of the oven, depending upon their densities relative to air.

Another continuous method would be to "plait" or pile folds of the freshly extruded foam onto a slow moving conveyor belt in rumpled fashion. This conveyor would move the foam through the treatment chamber. The curing time required for this method would probably be somewhat longer than that for the festooned (passed through rotating rollers) method because there would be less air flow between the layers of the sheet as the layers would not be physically separated (by rollers) but would be touching each other in many places. After exiting the oven, the plaited foam could then be wound up or dealt with in any suitable manner.

Figure 2:
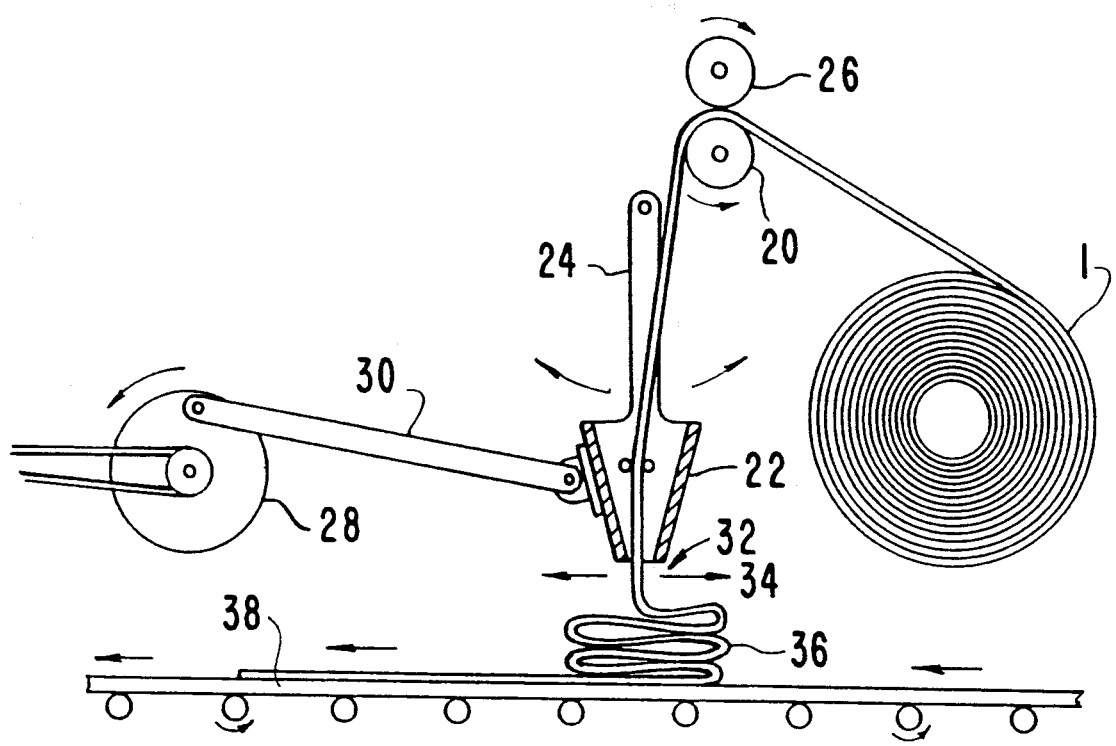
FIG. 2 is a schematic diagram of foam sheeting being plaited to form a rumpled stack or pile to be transported to an oven for heat treatment by means such as a conveyor belt.

FIG. 2 illustrates such a system for arranging foam sheeting so as to maximize surface area. As in FIG. 1, the foam sheeting is transported from roll (1) to a plaiting apparatus. It will be appreciated that in other embodiments the foam sheeting could come directly from an extruder. Foam sheeting passes between pulleys (20) and (21) and through guide (22) that is supported by rod (24), which is pivoted from support (26). Flywheel (28) is driven by means not shown to actuate an eccentric drive through rod (30), which causes the guide (22) from which the foam emerges at (32) to describe a reciprocating path as indicated by arrows (34) so that the sheeting is placed on a flat surface in a rumpled or overlapping piled configuration (36) on a horizontal surface. The sheeting can be cut by conventional cutting means (not shown) into suitable lengths so that the resulting piles of sheeting can be transported into an oven for heat-treating on a continuous or batch basis, but preferably is plaited onto a conveyor belt (38) which is in either continuous or intermittent motion and transports the plaited foam sheeting into an oven (as in FIG. 1) for heat treatment.

In utilizing the batch method, quantities of foam constituting one or more rolls of foam, usually up to about five rolls (a roll usually being between 30 and 36 inches in diameter), are placed in the heat treatment chamber for the time required to purge the blowing agent. These quantities of foam are preferably plaited, partially unwound or in separate sheets. In this way, air flows more easily between the plies of the foam, expediting the purging process. Much air flow, circulation, and exchange, as well as close temperature control, is required in the oven for this method, similar to the continuous scheme.

Since the rate of diffusion of the blowing agent from the foam products will depend upon the partial pressure of the blowing agent at the surface of the foam, it is desirable to minimize this partial pressure during the purging operation. Any suitable technique can be used to decrease such surface partial pressures of the blowing agent on the foam, including streams of air or other gases, movement of the foam product (e.g., sheeting) at a sufficient velocity (as on the rotating rollers of FIG. 1), agitating or vibrating the foam objects and the like. Physical means such as brushes or the like can also be used on the foam surface to facilitate the escape of the blowing agent. Removal of the blowing agent from the treatment chamber will also tend to minimize the surface partial pressure.

Although the process of heating the foam has been illustrated above as using a hot air oven, any suitable heating means can be used which will quickly raise the foam products to the critical temperature range at which rapid purging is obtained. For example, uniformly heated ovens, steam jets, and radiant heat emitted from steam-heated radiators, infrared lamps or the like can be used. Microwave energy can be used to heat batches of foam which contain suitable microwave-absorbent additives such as zinc halides, as disclosed in U.S. Pat. No. 3,640,913, to generate heat within the foam. Said patent is incorporated herein by reference.

The removal of a "substantial proportion" of residual blowing agent is defined to mean the reduction of the residual blowing agent to a level at which diffusion to the atmosphere under ambient conditions will be negligible. When flammable hydrocarbon blowing agents such as butane and isobutane are used, the content is preferably reduced to a level at which the escaping gases will not produce a mixture with air containing more than the minimum explosive limit after the foam product is allowed to stand for 24 hours at ambient conditions. The amount of residual blowing agent remaining (as a weight percentage of the foam) when these conditions are met will vary for the various different polymeric foams, optional permeability adjustment additives which may be used, and with the various blowing agents, but generally will be less than 2 weight percent of the foam product. Preferably, the blowing agent is reduced to less than about 1 weight percent, and most preferably less than about 0.5 weight percent.

It has been found that the curing temperature is critical in the process. As can be seen in the examples, for polyethylene foam sheet containing about 1 weight percent Pationic ™ 1052 as a permeability adjustment additive and predominately isobutane as the blowing agent, a curing temperature of 64° C. provides the optimum purging (most rapid), but a temperature of 66° C. destroys the foam. A temperature of 60° C. requires significantly more time (about double) to purge the foam of blowing agent. The polymer used, permeability modifier and level used, blowing agent, and foam thickness will all affect the optimum purging temperature. Ideally, the purging temperature will be controlled within plus to minus 2° C. For the continuous process, the purging time should be less than 3 hours, preferably less than one hour and more preferably less than one-half hour. For the batch method, the time required should be less than 24 hours, preferably less than 12 hours, more preferably less than 3 hours. The time required for thinner foam sheet will be less than for thicker foam sheet. In any case, by "rapid" purging it is meant that a substantial portion of the residual blowing agent is removed in a fraction of the time normally required to remove an equivalent proportion by aging the foam at ambient or slightly elevated temperatures. For various reasons, the invention may be practiced at temperatures just above those employed in the prior art for aging foam products, rather than the maximum temperature which avoids substantial collapse of the foam. For example, moderately elevated temperatures may produce both rapid purging of the blowing agent and slight increases in the size of the foamed objects. Generally, the purging temperature employed will be above about 120° F., but preferably above about 130° F., and most preferably above about 140° F.

By "substantial collapse" of the foam, it is meant that at least one dimension of the foam object (usually the thickness of foam sheeting, for example) is reduced by at least 20 percent and has been found to be irreversible and essentially unstoppable.

Although at present the critical range of temperatures does not appear to be defined by identifiable changes in the polymer itself, operable temperatures can readily be determined for various polymer formulations by reasonable experimentation. For production runs with similar polymer formulations, the development of a famil of curves of residual blowing agent contents versus time for various temperatures should permit computerized extrapolation to a three-dimensional mathematical surface which would allow the selection of the minimum temperature required to attain a given residual blowing agent level within a given time, the time required to attain a desired residual blowing agent level at a given temperature, and other useful estimates. As illustrated in Hypothetical Example 5 and FIGS. 3A and 3B, a lower critical temperature or "critical purging temperature" can be defined as the approximate temperature at which the rate of decrease of purge time as temperature increases begins to increase noticeably. While not wishing to be bound by theory or reaction mechanisms, it is believed that with most thermoplastic foams within the scope of the present invention the rate at which the blowing agent is purged from the foam increases markedly as the temperature increases above a critical purging temperature.

The polyolefins useful in the present invention are selected from homopolymers and copolymers of ethylenically-unsaturated monomers having from 2 to about 8 carbon atoms, such as ethylene, propylene, butenes, pentenes, hexenes and the like. These monomers preferably have from 2 to about 6 carbon atoms, and most preferably from 2 to 4 carbon atoms. The copolymers can include other compatible monomers, as described below. Presently, the polyethylene-type polymers are preferred, and such polymers are referred to in the disclosure and examples below, but this should be regarded as exemplary of the invention rather than limiting in any sense. Particularly preferred are the polyethylenes, including medium density polyethylene, low density polyethylene, and linear low density polyethylene. Such polyethylenes are described in the Kirk-Othmer *Encyclopedia of Chemical Technology*, Third Ed., Vol. 16, pages 385, 420, the *Modern Plastics Ency-* clopedia, 1986-87, pages 52-63, and in the *Encyclopedia of Polymer Science and Technology*, Vol. 7, page 610, which descriptions are incorporated herein by reference.

The term "polyethylene resin," as used in the present specification and the appended claims, is meant to include not only homopolymers of ethylene, but also ethylene copolymers composed of at least 50 mole percent, preferably at least 70 mole percent, of an ethylene unit and a minor proportion of a monomer copolymerizable with ethylene, and blends of at least 50 percent by weight, preferably at least 60 percent by weight, of the ethylene homopolymer or copolymer with another compatible polymer.

Examples of monomers copolymerizable with ethylene and other olefins are vinyl acetate, vinyl chloride, propylene, butene, hexene, acrylic acid and its esters, and methacrylic acid and its esters. The other polymer that can be blended with the ethylene homopolymer or copolymer may be any polymer compatible with it. Examples are polypropylene, polybutadiene, polyisoprene, polychloroprene, chlorinated polyethylene, high density polyethylenes, polyvinyl chloride, a styrene/butadiene copolymer, a vinyl acetate/ethylene copolymer, an acrylonitrile/butadiene copolymer, a vinyl chloride/vinyl acetate copolymer, etc. Especially preferred species are polypropylene, polybutadiene and styrene/butadiene copolymer. Surprisingly, it has been found that foamable melts can be produced from polymer blends of polystyrene with any suitable ethylene monopolymer or copolymer.

Examples of polyethylene resins that can be advantageously employed in the present invention are low-, medium- and high-density polyethylenes, and ethylene/vinyl acetate copolymer, an ethylene/propylene copolymer, copolymers of ethylene and methyl or ethyl acrylate, a blend of polyethylene and polypropylene, a blend of polyethylene and an ethylene/vinyl acetate copolymer, and a blend of polyethylene and an ethylene/propylene copolymer. Of these, the medium density polyethylenes, low density polyethylenes, and ethylene/propylene copolymers are especially suitable.

Preferably, the polyethylene resins have a softening point of less than 130° C. Furthermore, it is preferred that the polyethylene resin have a melt index of 0.2 to 20, preferably 0.3 to 6 decigrams per minute, and a density of 0.910 to 0.940, preferably 0.916 to 0.925 grams/cc.

The blowing agent used in the method of this invention is generally a volatile organic blowing agent such as a hydrocarbon or halogenated hydrocarbon. Examples of the former include ethane, propane, n-butane, isobutane, pentane, neopentane, isopentane, n-hexane, isohexane, cyclohexane and petroleum naphtha or "petroleum ether"; and examples of the latter include methyl chloride, methylene chloride, trichlorofluoromethane, chlorodifluoromethane, dichlorodifluoromethane, and 1,2-dichlorotetrafluoroethane. Petroleum naphtha and petroleum ether are used synonymously and refer to a specific distillation range for petroleum products under ASTM D86 which produces a liquid containing primarily pentane and/or hexane. Provided that they are non-reactive with the thermoplastic polymer(s) employed, the volatile organic blowing agent can include various organic compounds such as alcohols, esters, aldehydes and ketones—for example, methanol, ethanol, methyl acetate, ethyl acetate, acetone, methyl formate, ethyl formate, propionaldehyde and diisopropyl ether can all be used.

Suitable halogenated hydrocarbons can be obtained commercially from DuPont of Wilmington, Del. as FREON ® fluorocarbons, and from Allied chemical of Morristown, N.J. under the GENETRON ® Trademark. Preferred fluorocarbons for use in the present invention include FREON ® or GENETRON ® 12, 22 and 114. The numbers correspond to the chlorofluorocarbon (CFC) numbers known in the art. n-Butane, i-butane, propane and mixtures thereof are presently the most preferred hydrocarbons, due to their vapor pressure and solubility in polyolefin resins. Volatile organic blowing agents which are substantially soluble in the polyolefin resin to be processed are particularly preferred, as they produce finer, better distributed bubbles. The present invention is most useful in purging flammable blowing agents such as hydrocarbons from foam products, thereby eliminating fire and safety hazards.

Other blowing agents useful in the present invention and some of their physical properties are listed in Tables I and II, and in U.S. Pat. Nos. 3,843,757; 3,960,792; 3,657,165; 4,528,300; 4,368,276 and 4,214,054, all of which are incorporated herein by reference.

TABLE I

| BLOWING AGENT PHYSICAL PROPERTIES AT 25° C. | | | | | |
|---|---|---|---|---|---|
| Name | Formulas | Mwt | Bpt | Pvap | Liquid Density |
| CFC-11 | $CFCl_3$ | 137.4 | 23.8 | 15.32 | 1.476 |
| CFC-12 | $CF_2Cl_2$ | 120.9 | −29.8 | 94.51 | 1.311 |
| CFC-22 | $CHF_2Cl$ | 86.5 | −40.8 | 151.40 | 1.194 |
| CFC-113 | $CFCl_2CF_2Cl$ | 187.4 | 47.6 | 6.46 | 1.565 |
| CFC-114 | $CF_2ClCF_2Cl$ | 170.9 | 3.6 | 30.96 | 1.456 |
| CFC-115 | $CF_2ClCF_3$ | 154.5 | −38.7 | 132.18 | 1.284 |
| CFC-142b | $CF_2ClCH_3$ | 100.5 | −9.2 | 49.16 | 1.110 |
| CFC-152a | $CHF_2CH_3$ | 66.0 | −24.7 | 86.81 | 0.899 |
| CFC-123 | $CHCl_2CF_2$ | 153.0 | 27.1 | 13.27 | 1.461 |
| CFC-123a | $CHFClCF_2Cl$ | 153.0 | 28.2 | 12.61 | 1.467 |
| CFC-124 | $CHFClCF_3$ | 136.5 | −12.0 | 55.85 | 1.356 |
| CFC-134a | $CH_2FCF_3$ | 102.0 | −26.5 | 96.52 | 1.207 |
| MeCl | $CH_3Cl$ | 50.5 | −24.2 | 82.16 | 1.098 |
| $MeCl_2$ | $CH_2Cl_2$ | 84.9 | 40.1 | 8.22 | 1.322 |
| Propane | $C_3H_3$ | 44.1 | −42.1 | 137.89 | 0.491 |
| n-Butane | $C_4H_{10}$ | 58.1 | −0.5 | 35.26 | 0.573 |
| i-Butane | $CH_3(CH_3CHCH_3)$ | 58.1 | −11.7 | 50.53 | 0.551 |
| n-Pentane | $C_5H_{12}$ | 72.2 | 36.1 | 9.90 | 0.621 |
| i-Pentane | $CH_3(CH_3)CHCH_2CH_3$ | 72.2 | 27.0 | 14.23 | 0.615 |

TABLE II

| PROPERTIES OF TYPICAL PHYSICAL BLOWING AGENTS | | | | |
|---|---|---|---|---|
| Physical Foaming Agents | Mol. wt. | Density g/cc at 25° C. | BP °C. | Heat of Vaporization Cal (15° C./g) |
| Neopentane | 72.15 | 0.613 | 9.5 | |
| 1-Pentene | 70.15 | 0.641 | 30.0 | |
| Cyclopentane | 70.15 | 0.740 | 49.2 | |
| n-Hexane | 86.17 | 0.655 | 68.7 | 80.4 |
| Isohexane | 86.17 | 0.653 | 58.0 | 75.0 |
| 1-Hexene | 84.17 | 0.669 | 63.5 | |
| Cyclohexane | 84.17 | 0.774 | 80.8 | 94.8 |
| n-Heptane | 100.20 | 0.679 | 98.4 | 77.0 |
| Isoheptane | 100.20 | 0.670 | 90 | 78.4 |
| 1-Heptene | 98.20 | 0.693 | 93.2 | |
| Benzene | 78.11 | 0.874 | 80.1 | 94.1 |
| Toluene | 92.13 | 0.862 | 110.6 | 98.6 |

TABLE II-continued

PROPERTIES OF TYPICAL PHYSICAL BLOWING AGENTS

| Physical Foaming Agents | Mol. wt. | Density g/cc at 25° C. | BP °C. | Heat of Vaporization Cal (15° C./g) |
|---|---|---|---|---|
| Trichloromethane | 119.39 | 1.489 | 61.2 | 66.7 |
| Trichloroethylene | 131.40 | 1.466 | 87.2 | |
| 1,2,Dichloroethane | 98.97 | 1.245 | 83.5 | 77.3 |
| Tetrachloromethane | 170.90 | 1.440 | 3.6 | |
| Perfluorocyclobutane | 153.84 | 1.584 | 76.7 | 46.6 |

As mentioned above, the relative permeability of the polymer foam cell walls to the blowing agent as compared with air can be altered to produce suitable purging rates for the blowing agents by the use of additives such as solvents for polymers and so-called anti-aging additives or stability control agents, referred to herein as "permeability adjustment additives." Exemplary of such additives are esters of long-chain fatty acids and polyhydric alcohols as described in U.S. Pat. No. 3,644,230; saturated higher fatty acid amides, saturated higher aliphatic amines and complete esters of saturated higher fatty acids disclosed in U.S. Pat. Nos. 4,217,319 and 4,214,054, respectively, and mixtures of glycerol mono- and diglycerides, available commercially as Pationic TM products from the C. J. Patterson Co. of Kansas City, Mo. A particular version of such additives is a mixture of a minor portion of glycerol mono- and a major portion of distearates, sold commercially as ATMOS 150. Polystyrene can be utilized as a permeability adjusting additive with certain polyolefins, as disclosed in U.S. Pat. No. 4,640,933. Also useful as permeability adjusting additives are copolymers of α-olefins with various monoethylenically-unsaturated carboxylic acids, such as those described by Park in U.S. Pat. No. 4,347,329, and the copolymers of α-olefins with neutralized carboxyl-group bearing moieties commonly referred to in the art as ionomers. The permeability-adjusting additives, when used, are present in amounts effective to adjust the permeability of the polymer foam cell walls to the blowing agent used, relative to air or other ambient atmosphere, so as to produce the desired rate and degree of purging of the blowing agent. The amount of such additives can range from about 0.1 to 10 weight percent of the polymer composition, preferably from about 0.3 to about 2 weight percent, for the esters, amines, amides and the like; from about 5 to about 95 weight percent, preferably from about 10 to about 50, for α-olefin-carboxylic acid copolymers and ionomers and from about 5 to 50, preferably about 10 to 30, weight percent for the use of polystyrene in polyolefins.

EXAMPLES

The following Examples serve to give specific illustrations of the practice of this invention but they are not intended in any way to act to limit the scope of this invention. The numbered examples represent the present invention. The lettered examples do not represent the present invention and are for comparison purposes.

The following designations used in the examples and elsewhere in the present application have the following meanings:

| ABBREVIATION | DEFINITION |
|---|---|
| ASTM | American Society for Testing Materials |
| CFC, HCFC | chlorofluorocarbon, any of the commercially available organic compounds containing at least one carbon atom, fluorine and chlorine |
| °C. | temperature, degrees Centigrade |
| °F. | temperature, degrees Fahrenheit |
| dg/min. | melt index, decigrams per minute |
| g/cc | density, grams per cubic centimeter |
| g, gm | grams |
| hrs. | hours |
| " | inches |
| kg.cm$^{-2}$ | pressure, kilograms per square meter |
| kg/m$^3$, kg.m$^{-3}$ | density, kilograms per cubic meter |
| LDPE | low density polyethylene |
| min. | minutes |
| Pationic TM 1052 (P1052) | a mixture of glycerol mono- and diglycerides available commercially from the C. J. Patterson Co. of Kansas City, Mo. |
| pcf | pounds per cubic foot |
| psig | pounds per square inch, gage |

The following examples illustrate processes for rapid purging of hydrocarbon blowing agents from polyethylene foam sheeting. In all cases, except where noted, the foam was made with about 13 weight percent isobutane injected and the resin mixture added to the hopper contained about 1.0 weight percent Pationic TM 1052 as the permeability adjustment additive. Listed first are several test methods used for determining the blowing agent level in the samples.

Test method A: The mass of the sample is measured at various times. When the mass readings stop changing dramatically (0.5–1% of the original mass), it is assumed that only negligible amounts of blowing agent remain in the sample.

Test method B: Samples were taken and sealed in an air-tight vessel. The vessel was heated so as to draw the blowing agent from the foam into the vessel. The air in the vessel was then tested by gas chromatography to determine the amount of blowing agent present. The weight percent of blowing agent was calculated by dividing the weight of the blowing agent detected by the original sample weight.

Test method C: Samples were taken (approx. 12 inch by 12 inch) and weighed. The samples are then subjected to 135° C. for 20 minutes to drive off any of the volatile blowing agent. The samples are then reweighed. The blowing agent percent equals the weight difference found divided by the original weight.

EXAMPLE 1

LDPE foam of approximately 1.26 pcf (density measured 20 minutes after extrusion) and approximately one-eighth inch thick was produced on an extruder with an output of about 385 pounds per hour. Isobutane was used as the blowing agent and was injected at about 50 pounds per hour, or 13 weight percent of the foam output. Pationic TM 1052 was used as the permeability adjustment additive at about 1.0 percent of the resin input (approximately 335 pounds per hour). Samples were taken within 60 seconds of extrusion and subjected to aging at various temperatures. Small pieces were removed from these samples at various times and subject to Test Method B to determine the amount of isobutane remaining in the foam, listed as weight percent. The results are listed in Tables 1a, 1b, 1c, and 1d.

TABLE 1a

| | Curing Temperature: 76° F. (24.4° C.) | |
|---|---|---|
| AGING TIME | NUMBER OF SAMPLES MEASURED | ISOBUTANE WT. % (avg.) |
| 60 sec.* | 11 | 7.18 |
| 35 min. | 5 | 6.43 |
| 2 hr. | 5 | 5.20 |
| 6 hr. | 3 | 3.34 |
| 22 hr. | 4 | 0.47 |

TABLE 1b

| | Curing Temperature: 110° F. (43.3° C.) | |
|---|---|---|
| AGING TIME | NUMBER OF SAMPLES MEASURED | ISOBUTANE WT. % (avg.) |
| 60 sec.* | 11 | 7.18 |
| 1 hr. | 5 | 4.97 |
| 3 hr. | 4 | 0.80 |
| 6 hr. | 5 | 0.41 |

TABLE 1c

| | Curing Temperature: 140° F. (60° C.) | |
|---|---|---|
| AGING TIME | NUMBER OF SAMPLES MEASURED | ISOBUTANE WT. % (avg.) |
| 60 sec.* | 11 | 7.18 |
| 5 min. | 3 | 4.99 |
| 15 min. | 3 | 3.20 |
| 60 min. | 5 | 0.34 |

TABLE 1d

| | Curing Temperature: 160° F. (71.1° C.) | |
|---|---|---|
| AGING TIME | NUMBER OF SAMPLES MEASURED | ISOBUTANE WT. % (avg.) |
| 60 sec.* | 11 | 7.18 |
| 5 min. | 5 | 0.0 |
| 15 min. | 3 | 0.0 |
| 60 min. | 3 | 0.0 |

*All data for initial (60 sec.) samples averaged together.

All foam samples remained good in quality except for the foam subjected to 160° F. This foam was collapsed and would not recover. In the collapsed state, the foam is of little use.

This example illustrates that at around 140° F., the isobutane blowing agent can be purged from LDPE foam in a relatively short period of time without significant adverse effects upon the foam or functionality of the foam. The time required is less than one-sixth that required at 110° F., representative of a high ambient temperature. However, at some temperature between 140° F. and 160° F., the foam is destroyed. There thus must also be an optimum curing temperature between 140° F. and 160° F.

EXAMPLE 2

LDPE foam, very similar to that used in Example 1, was used. The foam sheet measured ⅛ inch, 10 seconds after extrusion. All samples were 12 inch by 12 inch sheets and were removed from the line approximately 60 seconds after exiting the die of the extruder. All samples were subjected to various temperatures and measured for dimensions and isobutane content using Test Method A. Various levels of Pationic ™ 1052 were used. In Table 2k, only the weight was measured of two samples held together to limit air flow between them. Table 2l lists weight measurements of four samples held together, further reducing the surface area.

TABLE 2a

| | | | 1.0% P1052 Curing Temp: 150.8° F. (66° C.) | | |
|---|---|---|---|---|---|
| TIME (min.) | MASS (gm) | % MASS Loss | LENGTH MACHINE DIR. (in.) | WIDTH TRANSVERSE DIR. (in.) | THICKNESS (in.) |
| 0 | 6.06 | — | 12.0 | 12 | 0.130 |
| 5 | 5.70 | 5.94 | 11.125 | 10.5 | 0.097 |
| 10 | 5.68 | 6.27 | 11.0 | 9.75 | 0.095 |
| 15 | 5.70 | 5.94 | 10.875 | 9.375 | 0.099 |
| 20 | 5.66 | 6.60 | 10.875 | 9.5 | 0.097 |

TABLE 2b

| | | | 1.0% P1052 Curing Temp: 147.2° F. (64° C.) | | |
|---|---|---|---|---|---|
| TIME (min.) | MASS (gm) | % MASS Loss | LENGTH MACHINE DIR. (in.) | WIDTH TRANSVERSE DIR. (in.) | THICKNESS (in.) |
| 0 | 6.37 | — | 12.0 | 12.0 | 0.118 |
| 5 | 6.18 | 2.98 | 11.5 | 11.5 | 0.119 |
| 10 | 6.13 | 3.77 | 11.5 | 11.5 | 0.121 |
| 15 | 6.11 | 4.08 | 11.5 | 11.5 | 0.118 |

TABLE 2c

| | | | 1.0% P1052 Curing Temp: 143.6° F. (62° C.) | | |
|---|---|---|---|---|---|
| TIME (min.) | MASS (gm) | % MASS Loss | LENGTH MACHINE DIR. (in.) | WIDTH TRANSVERSE DIR. (in.) | THICKNESS (in.) |
| 0 | 5.98 | — | 12 | 12 | 0.119 |
| 5 | 5.79 | 3.18 | 11.5 | 11.75 | 0.125 |
| 10 | 5.73 | 4.18 | 11.5 | 11.75 | 0.122 |
| 15 | 5.68 | 5.02 | 11.5 | 11.75 | 0.123 |

TABLE 2c-continued

| | | 1.0% P1052 Curing Temp: 143.6° F. (62° C.) | | | |
|---|---|---|---|---|---|
| TIME (min.) | MASS (gm) | % MASS Loss | LENGTH MACHINE DIR. (in.) | WIDTH TRANSVERSE DIR. (in.) | THICKNESS (in.) |
| 20 | 5.66 | 5.35 | 11.5 | 11.75 | 0.127 |

TABLE 2d

| | | 1.0% P1052 Curing Temp: 140° F. (60° C.) | | | |
|---|---|---|---|---|---|
| TIME (min.) | MASS (gm) | % MASS Loss | LENGTH MACHINE DIR. (in.) | WIDTH TRANSVERSE DIR. (in.) | THICKNESS (in.) |
| 0 | 6.31 | — | 12.0 | 12.0 | 0.125 |
| 5 | 6.12 | 3.01 | 11.5 | 11.75 | 0.123 |
| 10 | 6.08 | 3.65 | 11.5 | 11.75 | 0.123 |
| 15 | 6.05 | 4.12 | 11.5 | 11.75 | 0.125 |
| 20 | 6.02 | 4.60 | 11.5 | 11.75 | 0.118 |
| 25 | 6.03 | 4.44 | 11.5 | 11.75 | 0.120 |

TABLE 2e

| | | 1.0% P1052 Curing Temp: 76° F. (24.4° C.) | | | |
|---|---|---|---|---|---|
| TIME (min.) | MASS (gm) | % MASS Loss | LENGTH MACHINE DIR. (in.) | WIDTH TRANSVERSE DIR. (in.) | THICKNESS (in.) |
| 0 | 5.81 | — | 12 | 12 | 0.118 |
| 5 | 5.79 | 0.34 | 11.875 | 11.875 | 0.120 |
| 10 | 5.78 | 0.52 | 11.875 | 11.75 | 0.121 |
| 15 | 5.78 | 0.52 | 11.875 | 11.75 | 0.120 |

TABLE 2f

| | 0.5% P1052 Curing Temp: 107.6° F. (42° C.) | | |
|---|---|---|---|
| TIME (min.) | MASS (gm) | % MASS Loss | THICKNESS (in.) |
| 0 | 5.66 | — | 0.094 |
| 5 | 5.59 | 1.24 | 0.094 |
| 10 | 5.55 | 1.94 | 0.095 |
| 25 | 5.48 | 3.18 | 0.094 |

TABLE 2g

| | 0.5% P1052 Curing Temp: 76° F. (24.4° C.) | | |
|---|---|---|---|
| TIME (min.) | MASS (gm) | % MASS Loss | THICKNESS (in.) |
| 0 | 5.82 | — | 0.099 |
| 5 | 5.78 | 0.69 | 0.096 |
| 10 | 5.75 | 1.20 | 0.097 |
| 25 | 5.73 | 1.55 | 0.097 |

TABLE 2h

| | 0.0% P1052 Curing Temp: 143.6° F. (62° C.) | |
|---|---|---|
| TIME (min.) | MASS (gm) | % MASS Loss |
| 0 | 5.42 | — |
| 5 | 5.21 | 3.87 |
| 10 | 5.18 | 4.43 |
| 15 | 5.19 | 4.24 |
| 20 | 5.18 | 4.43 |

TABLE 2i

| | 0.0% P1052 Curing Temp: 114.8° F. (46° C.) | |
|---|---|---|
| TIME (min.) | MASS (gm) | % MASS Loss |
| 0 | 5.84 | — |
| 5 | 5.57 | 4.62 |
| 10 | 5.58 | 4.45 |
| 15 | 5.58 | 4.45 |

TABLE 2j

| | 0.0% P1052 Curing Temp: 76° F. (24.4° C.) | |
|---|---|---|
| TIME (min.) | MASS (gm) | % MASS Loss |
| 0 | 5.62 | — |
| 5 | 5.48 | 2.49 |
| 10 | 5.46 | 2.85 |
| 15 | 5.39 | 4.09 |
| 20 | 5.40 | 3.91 |

TABLE 2k

| | 1.0% P1052 Stacks of 2 sheets Curing Temp: 143.6° F. (62° C.) | |
|---|---|---|
| TIME (min.) | MASS (gm) | % MASS Loss |
| 0 | 11.88 | — |
| 5 | 11.64 | 2.02 |
| 10 | 11.57 | 2.61 |
| 15 | 11.50 | 3.20 |
| 20 | 11.50 | 3.20 |

TABLE 2l

| | 1.0% P1052 Stacks of 2 sheets Curing Temp: 140° F. (60° C.) | |
|---|---|---|
| TIME (min.) | MASS (gm) | % MASS Loss |
| 0 | 11.60 | — |
| 5 | 11.41 | 1.64 |
| 10 | 11.28 | 2.76 |
| 15 | 11.25 | 3.02 |

TABLE 2l-continued 1.0% P1052 Stacks of 2 sheets
Curing Temp: 140° F. (60° C.)

| TIME (min.) | MASS (gm) | % MASS Loss |
|---|---|---|
| 20 | 11.20 | 3.45 |

TABLE 2m 1.0% P1052 Stacks of 4 sheets
Curing Temp: 143.6° F.

| TIME (min.) | MASS (gm) | % MASS Loss |
|---|---|---|
| 0 | 24.17 | — |
| 5 | 23.77 | 1.65 |
| 10 | 23.64 | 2.19 |
| 15 | 23.57 | 2.48 |
| 20 | 23.50 | 2.77 |

TABLE 2n 1.0% P1052 Stacks of 4 sheets
Curing Temp: 140° F. (60° C.)

| TIME (min.) | MASS (gm) | % MASS Loss |
|---|---|---|
| 0 | 25.24 | — |
| 5 | 24.80 | 1.74 |
| 10 | 24.73 | 2.02 |
| 15 | 24.65 | 2.34 |
| 20 | 24.59 | 2.58 |

The sample in 2a was destroyed almost immediately upon contact with the elevated temperature (66° C.). The samples containing 0.5 weight percent P1052 (2f and 2g) collapsed 20 percent in thickness between the time they were extruded and the time the samples were cut (60 sec.). They did not recover to good salable condition within 2 weeks, but did continue to recover as time passed. The samples containing no P1052 (2h, 2i, and 2j) collapsed even further than those with 0.5 weight percent P1052, took significantly more time to recover and did not recover as much.

This example illustrates that with foam containing 1.0 weight percent P1052, a temperature of 66° C. is too hot for curing the foam, temperatures of 62° to 64° C. are optimum (requiring the shortest time period for sufficient purging), and 60° C. is acceptable but requires somewhat more time. Foam containing less than about 1.0 weight percent P1052 probably has a lower optimum curing temperature, but the blowing agent can be purged effectively and rapidly at elevated temperatures. Foam containing less than 1.0 weight percent P1052 is easier to purge but the foam sheeting ends up somewhat thinner and more dense, probably reducing its effectiveness as protective packaging and its economy. The effect of air circulation over the foam surfaces is displayed by the longer purging times required for the stacks of foam, compared to single sheets of equivalent composition.

EXAMPLES 3 and 4

An oven was constructed to perform full scale type trials examining different aspects of the invention. The oven was totally enclosed and the air blown into the oven was heated by two cal-rod type heaters. This hot air was blown into several places throughout the oven. Air was drawn out of the oven from two ports placed on the floor at the opposite end of the oven from where the air was introduced. The outside dimensions of the oven were approximately 10 feet wide by 9 feet tall by 40 feet long. Rollers were placed near the floor and top of the oven spaced about 5.5 feet apart vertically. The rollers were spaced so as to give the oven the capacity to hold about 400 feet of 60 inch wide foam sheet. The top rollers were driven by a variable speed drive so the foam could be fed through the oven at any speed. This speed was matched to a winding apparatus placed after the oven.

In Example 3, LDPE foam sheeting of various thicknesses was used, all of which contained 1.0 weight percent P1052 and 13 percent isobutane. The foam was run through the oven with different residence times (the sheet feed was stopped if necessary). The isobutane level was measured using Test Method C for the various curing times. Since the oven was located in a remote location from the extrusion line, the foam used for the curing tests was rolled up at the line and brought to the oven for testing. Testing commenced within 15 minutes from manufacture. The residual isobutane results are listed below (in percent by weight of the sample).

TABLE 3a

| TIME (min.) | Curing Temp: 142° F. (61.1° C.) Sheet Thickness (in.) | | | | |
|---|---|---|---|---|---|
| | 1/32 | 1/16 | 3/32 | ⅛ | 3/16 |
| 0 | 2.93 | 4.09 | 4.92 | 5.14 | 4.89 |
| 5 | 2.41 | — | — | — | — |
| 10 | 0.44 | 2.22 | 2.95 | 3.92 | — |
| 15 | — | — | — | — | — |
| 20 | 0.23 | 0.25 | 1.57 | 2.06 | 3.62 |
| 30 | — | — | — | — | 2.22 |
| 40 | — | — | — | — | 1.46 |

TABLE 3b

| | Curing Temp: 104° F. (40° C.) |
|---|---|
| TIME (min.) | Sheet Thickness (in.) ⅛ |
| 0 | 5.69 |
| 20 | 5.29 |
| 30 | 4.88 |
| 40 | 3.34 |

From the results, it can be seen that the thinner the foam, the more isobutane is lost between the die of the extruder and the winder (note the lower initial isobutane percent readings for the thinner foam.) Overall, it requires less than 10 minutes to reduce the isobutane level to below 1 weight percent for the 1/32 inch foam and less than 20 minutes for the 1/16 inch.

For Example 4, the same oven was used but LDPE foam rolls were used in a manner in which the foam was stacked in rumpled fashion so that some air could circulate between the plies. Freshly made foam rolls were cut down to the core, laid open onto a pallet and then placed in the oven. Samples were then removed from the center of the cut open rolls at various times and checked for residual isobutane percent using Test Method C. The isobutane levels are shown in Table 4.

TABLE 4

| TIME (hr.) | Curing Temp: 142° F. (61.1° C.) Sheet Thickness (in.) | | | | |
|---|---|---|---|---|---|
| | 1/32 | 1/16 | 3/32 | ⅛ | 3/16 |
| 0 | 2.93 | 3.34 | 4.93 | 5.38 | 4.98 |
| 3 | 0.0 | 0.72 | 2.72 | 4.06 | — |
| 6 | — | 0.31 | 2.16 | 3.10 | 3.11 |
| 9 | — | — | 0.58 | 2.70 | — |

TABLE 4-continued

| TIME (hr.) | Curing Temp: 142° F. (61.1° C.) | | | | |
|---|---|---|---|---|---|
| | Sheet Thickness (in.) | | | | |
| | 1/32 | 1/16 | 3/32 | ⅛ | 3/16 |
| 12 | — | — | — | 1.68 | 0.96 |

Example 4 illustrates that the residual isobutane level in LDPE foam can be reduced to below 1.0 weight percent in reasonably short time periods by curing loosely stacked or plaited foam sheeting. The curing apparatus required for this method would require fewer moving parts than the continuous feed oven used in Example 3 but would probably have to be significantly larger.

COMPARATIVE EXAMPLE A

A 1000-foot roll of 1/16 inch thick LDPE foam containing 13 weight percent isobutane and 1.0 weight percent P1052 was stored in temperatures of 60° to 70° F. for one month (simulating warehouse conditions). At 7 days, using Test Method C, the isobutane level in the roll was found to be 3.73 weight percent. This shows that even after 27 days storage at usual warehouse conditions in tight roll form, LDPE foam made with an isobutane blowing agent will still contain significant residual levels of this flammable gas.

The previous examples definitely show that the methods of the present invention for rapid purging of blowing agents from foamed polymers are viable processes. Applicant has found no references in current literature or patents which indicate such advantages of accelerating the diffusion of blowing agent from foamed polymers. In fact, U.S. Pat. Nos. such as 4,387,169, 3,067,147, 3,657,165, 4,110,269, 4,694,027, 3,810,964, 3,644,230 and 4,214,054 are concerned with keeping the blowing agent contained within the foam for the prevention of cell collapse. Patents such as those above and U.S. Pat. No. 3,960,792 disclose methods of equilibrating the diffusion rate of air into the foam to the diffusion rate of blowing agent out of the foam by using proper blowing agents and/or permeability adjustment additives, but none employ elevated temperatures either to hasten the gas exchange or to equilibrate it.

HYPOTHETICAL EXAMPLE 5

Figure 3A:
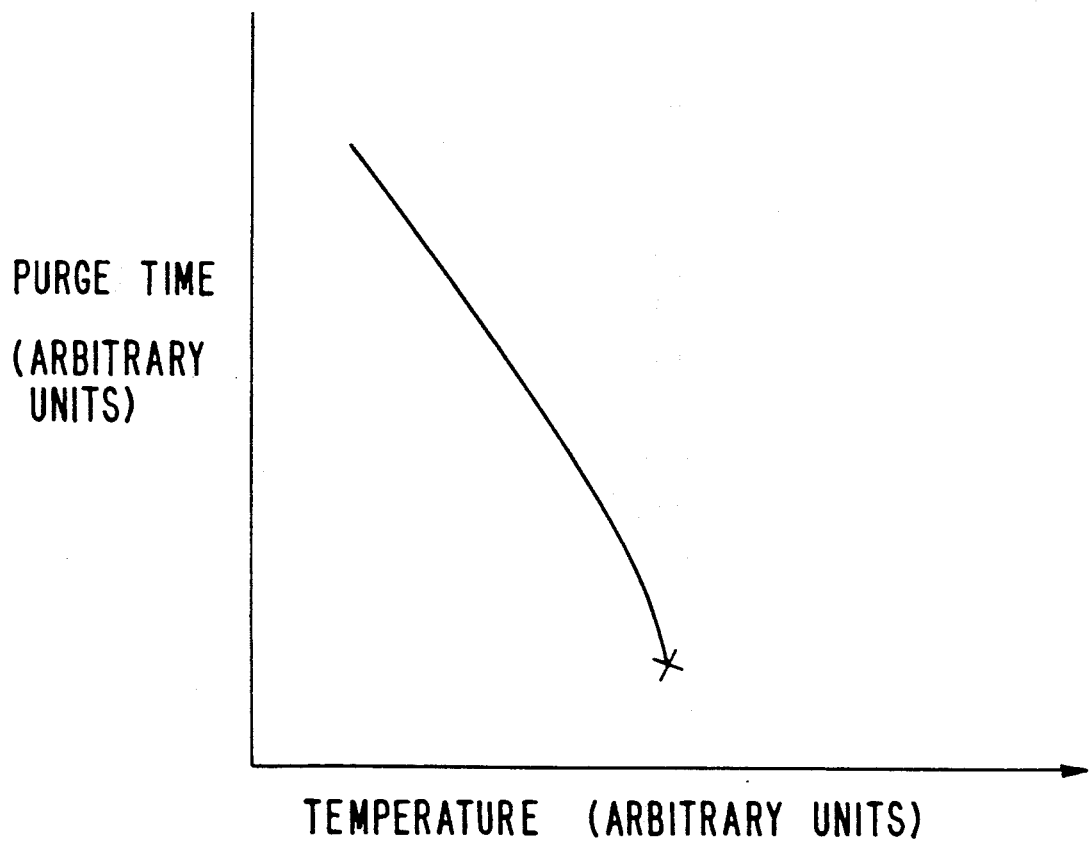
FIGS. 3A and 3B illustrate the rate of change of the time required to purge a foam object of blowing agent at various temperatures.
Figure 3B:
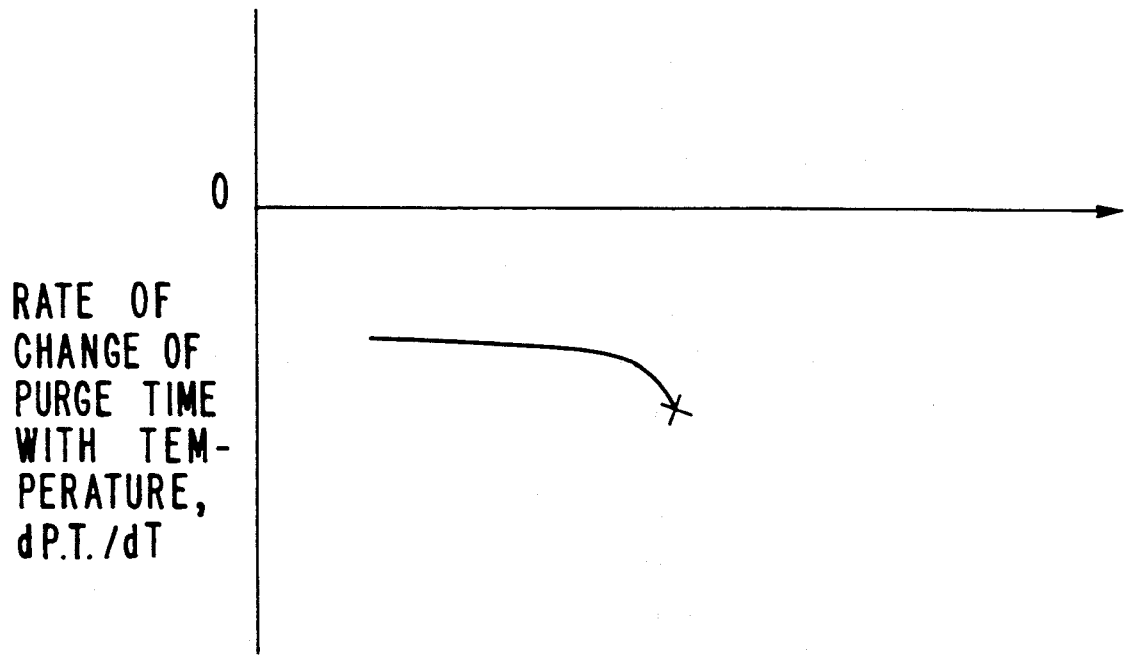

As shown in FIG. 3A, a hypothetical plot of the time required to achieve a substantial reduction in residual blowing agent content (in arbitrary units of time) versus the temperature to which the foam is exposed (again in arbitrary units), the time required decreases rapidly as temperature increases according to an exponential curve. This rate of decrease increases noticeably at temperatures just below that at which the foam collapses, as seen in FIG. 3B, in which the first derivative of the curve of FIG. 3A is shown in arbitrary units of time and temperature per unit time. This derivative curve reveals the temperature at which the rate of decrease of time required for purging increases, thus indicating a lower threshold temperature for the critical temperature range in which the purge time can be described as rapid. This temperature will be referred to as the critical purging temperature. The temperature employed in treating the foam is preferably at least equal to this temperature, and less than the temperature at which the foam collapses.

These examples illustrate that the purging of residual blowing agents from thermoplastic polymeric foam products such as polyolefin foam sheeting can be significantly accelerated by subjecting the products to elevated temperatures above those customarily employed for aging polymeric foam products, in both continuous and batch processes. However, these examples should not be considered as limiting the scope of the present invention, which is limited only by the appended claims.

I claim:

1. A method for rapidly purging residual blowing agent from polymeric foam products comprising a step of heating extruded thermoplastic polymer foam structures at an elevated temperature effective to remove a substantial portion of the residual blowing agent from said foam and to cause sufficient air to diffuse into said foam so as not to cause substantial collapse of said foam.

2. A method in accordance with claim 1 wherein said elevated temperature is above about 120° F.

3. A method in accordance with claim 1 wherein said thermoplastic polymer is a polyolefin selected from the group consisting of homopolymers and copolymers comprising olefin monomers having from 2 to about 8 carbon atoms.

4. A method in accordance with claim 3 wherein said polyolefin is selected from the group consisting of polypropylene, medium density polyethylene, high density polyethylene, low density polyethylene, linear low density polyethylene, polybutylene and mixtures thereof.

5. A method in accordance with claim 1 wherein a substantial portion of said residual blowing agent is removed in a substantially shorter time than by aging said foam at ambient conditions.

6. A method in accordance with claim 1 wherein said foam structures are formed as sheets, planks or films.

7. A method in accordance with claim 1 wherein said structures are moved through a heating zone by transport means.

8. A method in accordance with claim 7 wherein said polymer structure is a sheet or film which is festooned over driven roller means or plaited in rumpled fashion to increase the surface area thereof which is exposed to the atmosphere.

9. A method in accordance with claim 7 wherein said transport means include at least one conveyor belt.

10. A method in accordance with claim 1 wherein said elevated temperature is produced by heating means selected from the group consisting of convection heaters, heated gas currents and radiant heaters.

11. A method in accordance with claim 1 wherein said polymer foam comprises a permeability adjustment additive in an amount effective to reduce the time required for purging a substantial portion of said residual blowing agent.

12. A method in accordance with claim 11 wherein said permeability adjustment additives are selected from the group consisting of esters of long-chain fatty acids and polyhydric alcohols, saturated higher fatty acid amides, saturated higher aliphatic amines, complete esters of saturated higher fatty acids, mixtures of glycerol mono- and diglycerides and polystyrenes.

13. A method in accordance with claim 1 wherein said blowing agent is selected for relatively rapid diffusion through the cell walls of the polymer foam employed.

14. A method in accordance with claim 1 wherein said blowing agent is a halogenated hydrocarbon.

15. A method in accordance with claim 1 wherein said blowing agent is selected from the group consisting of hydrocarbons, alcohols, aldehydes, ketones and esters.

16. A method in accordance with claim 15 wherein the amount of the residual blowing agent is reduced sufficiently to prevent the formation of explosive mixtures with air under ambient conditions in which the purged foam products are transported or stored.

17. A method in accordance with claim 1 wherein said residual blowing agent is reduced to an amount less than about 2 weight percent of said polymer foam within a time less than about 12 hours.

18. A method in accordance with claim 17 wherein said time is less than about 3 hours.

19. A method in accordance with claim 7 wherein an extruded sheet or other elongated foam product is passed through an oven or other chamber for thermal treatment by driven roller means or conveyor belt in a time effective to remove a substantial portion of the residual blowing agent.

20. A method in accordance with claim 1 wherein said extruded polymer foam product is sheeting which is placed in a oven in rumpled fashion for a time effective to remove a substantial portion of the residual blowing agent.

21. A method in accordance with claim 20 wherein said foam is retained in said oven for less than about 24 hours.

22. A method in accordance with claim 19 wherein said oven comprises means for recovering the extracted blowing agent.

23. A method in accordance with claim 20 wherein said oven comprises means for recovering the extracted blowing agent.

24. A method for rapidly purging residual blowing agent from polyolefin foam products comprising a flammable hydrocarbon blowing agent or a halogenated hydrocarbon blowing agent, said method comprising the steps of:
(a) increasing extruded foam sheeting surface area exposed to the atmosphere; and
(b) treating said extruded foam sheeting at an elevated temperature above about 120° F. but below the melting temperature of said polyolefin in a heating zone for a time and at a temperature effective to reduce the content of said residual blowing agent in said foam to less than about 2 weight percent of said foam and to cause air to diffuse into said polyolefin foam so as not to cause substantial collapse of said foam.

25. A method in accordance with claim 24 wherein said residual blowing agent is reduced to less than about 2 weight percent of said foam within less than about 12 hours.

26. A method in accordance with claim 24 wherein said foam sheeting is festooned over roller transport means to increase the surface area exposed to the atmosphere.

27. A method in accordance with claim 24 wherein said foam sheeting is arranged in rumpled fashion upon a conveyor belt for transport through a heating zone.

28. A method in accordance with claim 24 wherein said blowing agent is selected from the group consisting of ethane, propane, n-butane, isobutane, pentane, neopentane, isopentane, n-hexane, isohexane, cyclohexane and petroleum ether.

29. A method for rapidly purging residual, flammable blowing agent from polyolefin foam products, comprising the step of heating extruded foam sheeting to a temperature range above about 120° F. to below about the melting temperature of said polyolefin for a sufficient time and at a sufficient temperature to purge a substantial portion of the residual blowing agent from said foam products and to cause air to diffuse into the foam so as not to cause substantial collapse of said foam products.

30. The method of claim 29 wherein the method is a batch method and wherein said sufficient time is less than 24 hours.

31. The method of claim 30 wherein the content of the residual, flammable blowing agent is reduced to less than about 2 weight percent of said foam products.

32. The method of claim 29 wherein the method is a continuous method and wherein said sufficient time is less than 3 hours.

33. The method of claim 32 wherein the content of the residual, flammable blowing agent is reduced to less than about 2 weight percent of said foam products.

* * * * *